(12) United States Patent
Gouthro et al.

(10) Patent No.: US 8,695,268 B2
(45) Date of Patent: Apr. 15, 2014

(54) METHOD AND APPARATUS FOR HOLDING FISHING ROD

(76) Inventors: Bryan Gouthro, Hinton (CA); Richard Fuchs, De Winton (CA)

( * ) Notice: Subject to any disclaimer, the term of this patent is extended or adjusted under 35 U.S.C. 154(b) by 439 days.

(21) Appl. No.: 12/814,221

(22) Filed: Jun. 11, 2010

(65) Prior Publication Data

US 2011/0302820 A1    Dec. 15, 2011

(51) Int. Cl.
*A01K 97/12*    (2006.01)
(52) U.S. Cl.
USPC .............................. 43/17; 43/21.2; 248/532
(58) Field of Classification Search
USPC ........................... 43/17, 21.2; 248/530, 532
IPC .............................................. A01K 97/10,97/12
See application file for complete search history.

(56) References Cited

U.S. PATENT DOCUMENTS

| 1,577,612 | A | * | 3/1926 | Dees | 248/532 |
|---|---|---|---|---|---|
| 2,603,900 | A | * | 7/1952 | Kellett | 43/17 |
| 3,874,107 | A | * | 4/1975 | Wheaton | 43/17 |
| 4,154,015 | A | * | 5/1979 | Holland | 43/17 |
| 4,240,221 | A | * | 12/1980 | Komarnicki | 43/17 |
| 4,506,468 | A | * | 3/1985 | Willhite | 43/17 |
| 4,972,622 | A | * | 11/1990 | Fuchs | 43/17 |
| 5,025,583 | A | * | 6/1991 | Langley | 43/17 |
| 6,000,808 | A | * | 12/1999 | Hansen | 362/109 |
| 2008/0168698 | A1 | * | 7/2008 | Bailey | 43/17 |
| 2009/0119969 | A1 | * | 5/2009 | Cavanaugh | 43/21.2 |

* cited by examiner

*Primary Examiner* — Darren W Ark
*Assistant Examiner* — Thien Thanh Pham
(74) *Attorney, Agent, or Firm* — Walter J. Tencza, Jr.

(57) ABSTRACT

An apparatus including a stake device for driving into a ground surface, a first device having a cavity into which a fishing rod handle can be inserted, and an alarm device. The stake device may be attached to or detached from the first device. The alarm device is triggered when the fishing rod handle is within the cavity of the first device and is sufficiently jostled as a result of a fish tugging on a fishing line connected to the fishing rod handle The first device may include a first compartment and a second compartment, wherein the first compartment fits within the second compartment, and the cavity is within the first compartment. The alarm device may include a first metal conductor attached to a periphery of the first compartment, and a second metal conductor attached to an interior of the second compartment.

7 Claims, 15 Drawing Sheets

METHOD AND APPARATUS FOR HOLDING FISHING ROD

FIELD OF THE INVENTION

This invention relates to improved methods and apparatus concerning holding fishing poles or rods.

BACKGROUND OF THE INVENTION

There are various devices known in the prior art for holding fishing poles or rods.

SUMMARY OF THE INVENTION

In at least one embodiment of the present invention an apparatus is provided comprising a stake device for driving into a ground surface, a first device having a cavity into which a fishing rod handle can be inserted, and an alarm device. The stake device may be attached to or detached from the first device. The alarm device is triggered when the fishing rod handle is within the cavity of the first device and is sufficiently jostled as a result of a fish tugging on a fishing line connected to the fishing rod handle.

The first device may include a first compartment and a second compartment, wherein the first compartment fits within the second compartment, and the cavity is within the first compartment. The first compartment may be a hollow cylinder or may be hollow and substantially cylindrically shaped. The second compartment may be a hollow cylinder or may be hollow and substantially cylindrically shaped. The alarm device may include a first metal conductor attached to a periphery of the first compartment, and a second metal conductor attached to an interior of the second compartment. The alarm device may be triggered by the first metal conductor making electrical contact with the second metal conductor.

The triggering of the alarm device may cause an audible alarm sound to be emitted from the alarm device and/or a visual alarm to be emitted from the alarm device. The alarm device may include one or more light emitting diodes which emit light when the alarm device is triggered.

In at least one embodiment a flashlight device may also be provided which operates independently of the alarm device. The stake device may be configured so that it can be attached to the first device at a first end of the first device at which is located the flashlight device, so that when the stake device is attached at the first end of the first device, substantially no light can be seen emitted from the first device by the flashlight device. The stake device may be configured so that the stake device can be detached from the first end of the first device so that light can be seen emitted from the first device by the flashlight device.

The stake device may be configured so that it can be attached to the first device at a second end of the first device, opposite the first end, so that the majority of the stake device lies inside of the cavity of the first device.

The apparatus may also include a means for adjusting a sensitivity of the alarm device so that a greater or a less amount of jostling of the fishing rod handle within the cavity is required to cause the alarm device to trigger. The means for adjusting the sensitivity of the alarm device may include a sliding device which slides up and down the outside periphery of the second compartment and which is configured so that the sliding device can contact a portion of the first compartment.

At least one embodiment of the present invention includes a method comprising attaching a stake device to a first device, driving the stake device into a ground surface, and inserting a fishing rod handle into a cavity of the first device, wherein the first device includes an alarm device triggered by jostling of the fishing rod handle. The first device and stake device may be as previously described. The method may also include operating a flashlight device which is part of the first device, wherein the flashlight device operates independently of the alarm device.

DETAILED DESCRIPTION OF THE DRAWINGS

Figure 1:
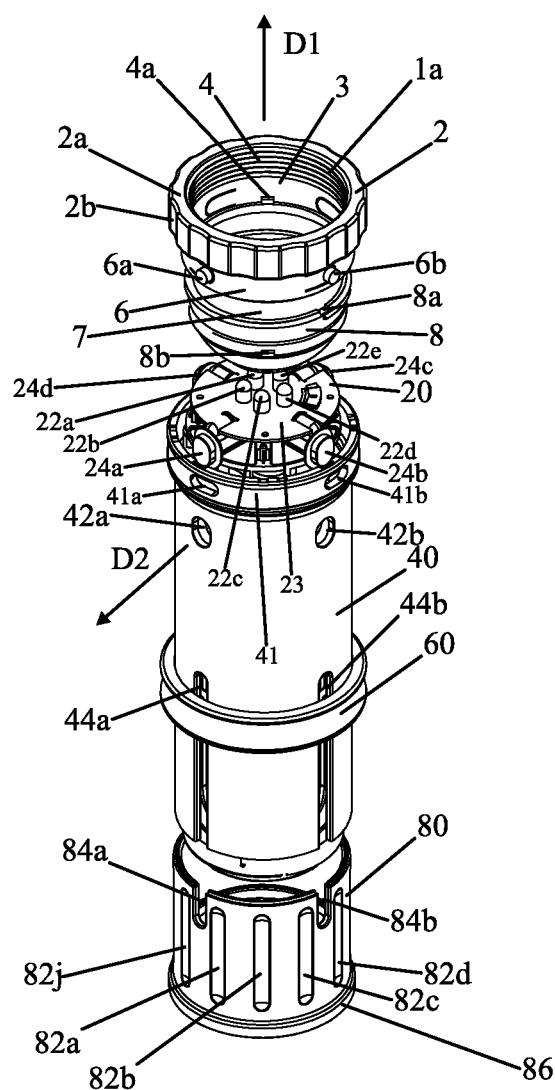
FIG. 1 shows a bottom perspective exploded or disassembled view of parts of an apparatus in accordance with an embodiment of the present invention.
Figure 4A:
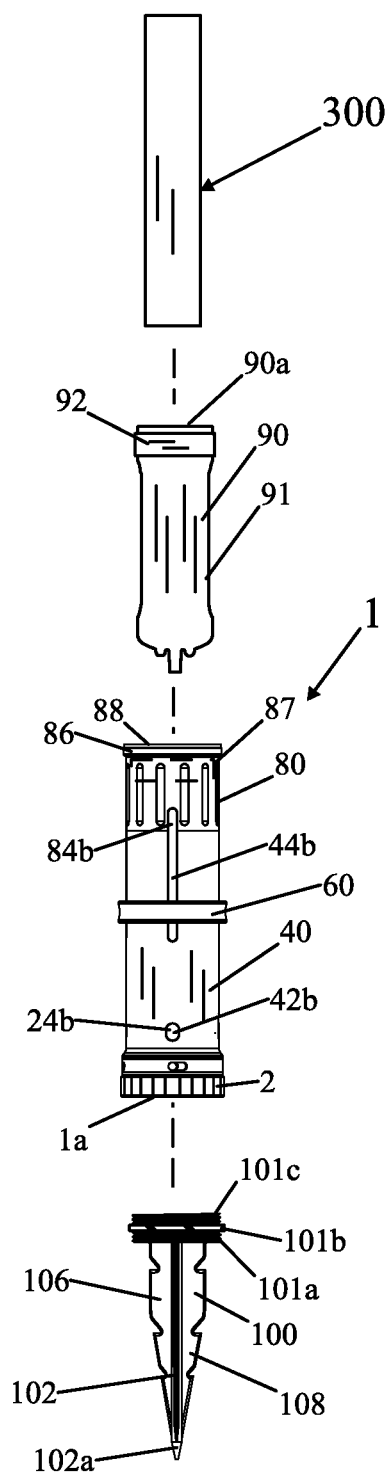
FIG. 4A shows a side view of the apparatus of FIG. 2 along with a part of a fishing pole with the apparatus in a second state in which the apparatus has been partially taken apart.

FIG. 1 shows a bottom perspective exploded or disassembled view of a portions of an apparatus 1 (which would also include section or compartment 90 and spike or stake section 100 shown in FIG. 4A), in accordance with an embodiment of the present invention.

Figure 2:
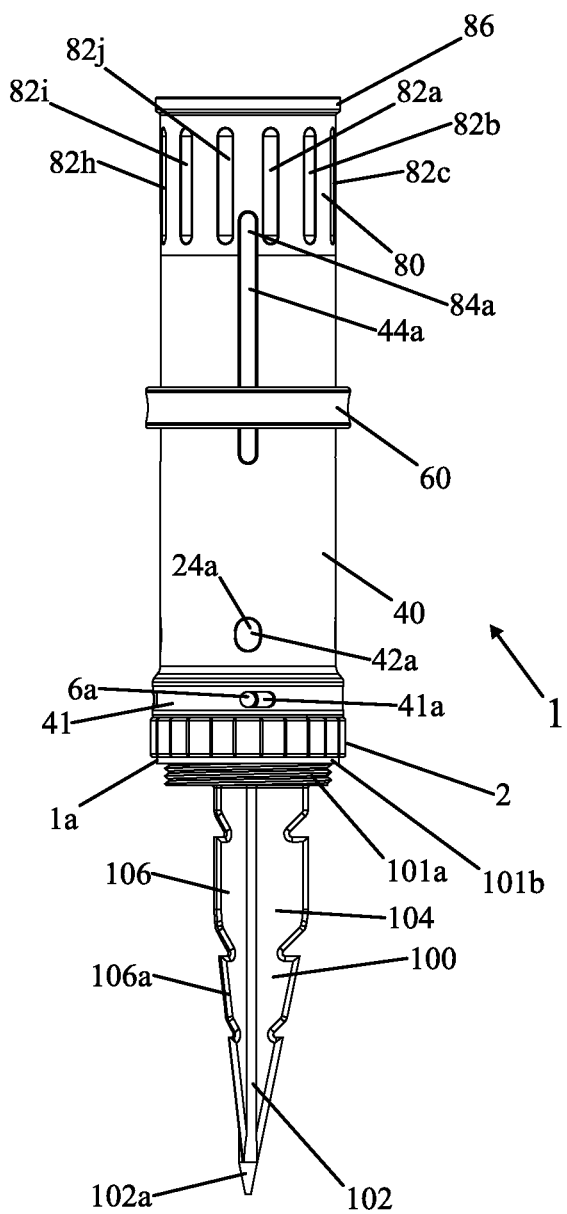
FIG. 2 shows a front view of an assembled apparatus in accordance with an embodiment of the present invention, with the apparatus in a first state in which a spike or stake section is attached to a flashlight end of the apparatus.

FIG. 2 shows a front view of an assembled apparatus 1 in accordance with an embodiment of the present invention, with the apparatus 1 in a first state in which a spike or stake section 100 is attached to a flashlight end 1a of the apparatus 1.

Figure 3:
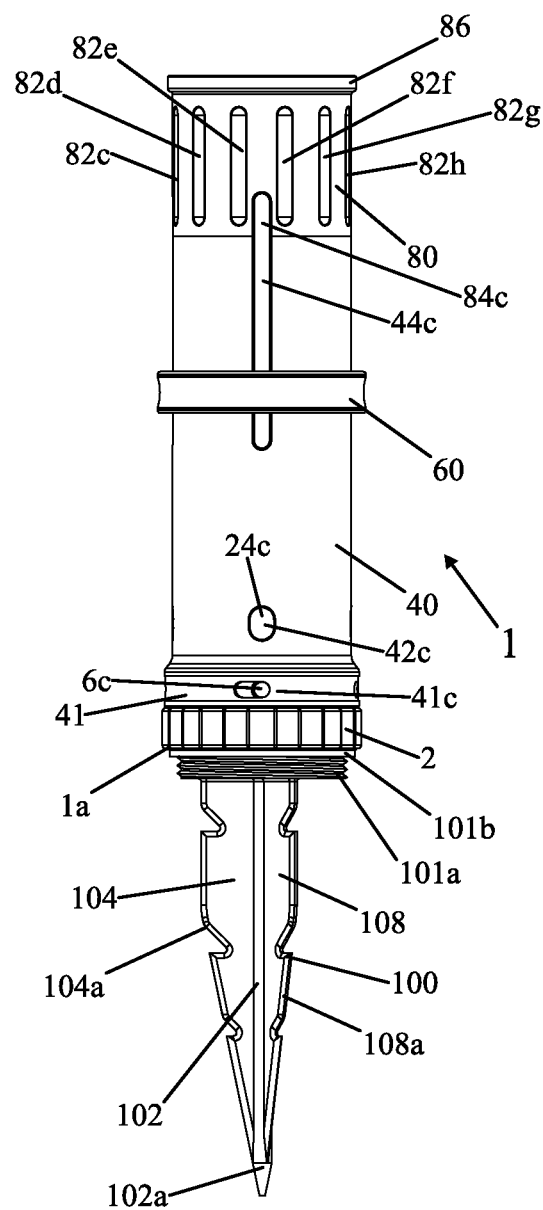
FIG. 3 shows a back view of the apparatus of FIG. 2, with the apparatus assembled and in the first state.

FIG. 3 shows a back view of the apparatus 1 of FIG. 2, with the apparatus 1 assembled and in the first state.

FIG. 4A shows a side view of the apparatus 1 of FIG. 2 along with a part of a fishing pole 300, such as a handle of a fishing pole, with the apparatus 1 in a second state in which the apparatus has been partially taken apart.

Figure 4B:
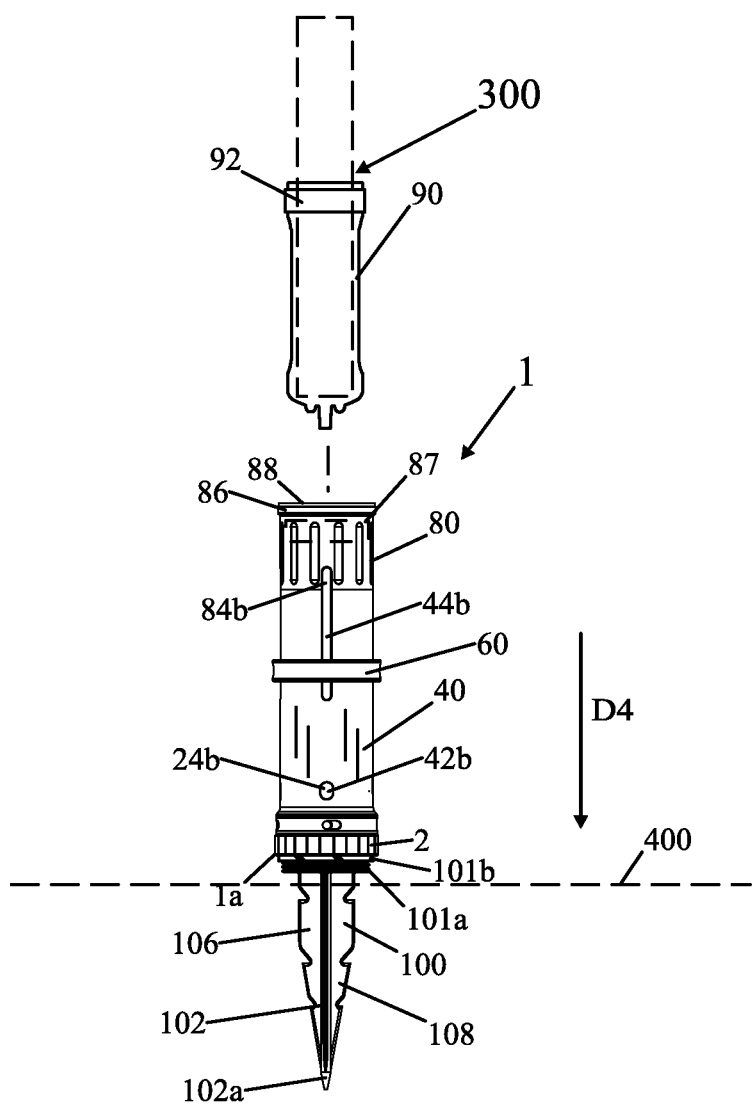
FIG. 4B shows a side view of the apparatus of FIG. 2 along with a part of the fishing pole inserted into a part of the apparatus and with the spike or stake section attached to the flashlight end, and with the apparatus in a partially assembled third state.

FIG. 4B shows a side view of the apparatus 1 of FIG. 2 along with a part of the fishing pole 300 inserted into the compartment or section 90 of the apparatus 1 and with the spike or stake section 100 attached to the flashlight end 1a, and with the apparatus 1 in a partially assembled third state.

Figure 4C:
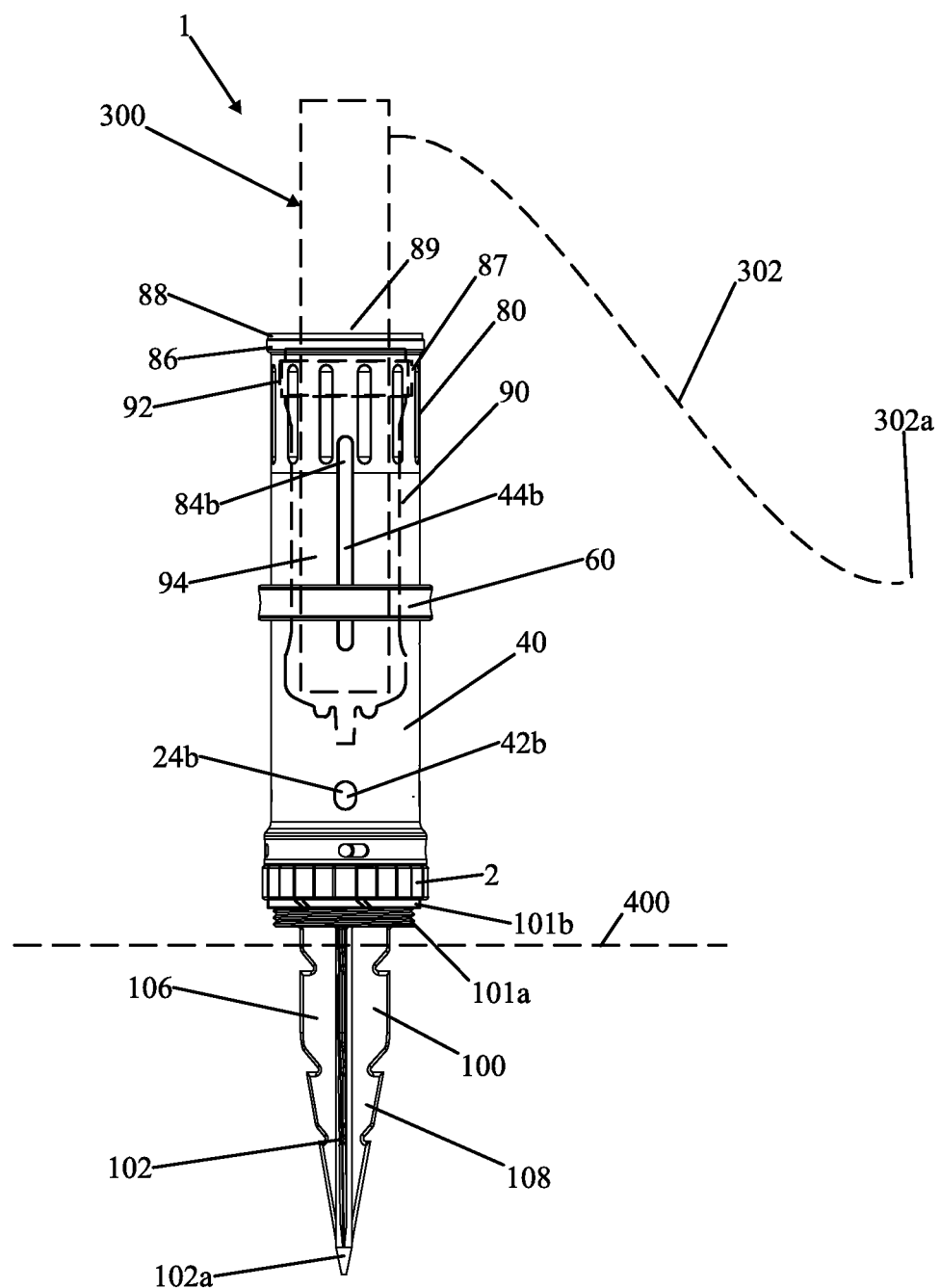
FIG. 4C shows a shows a side view of the apparatus of FIG. 2 along with a part of the fishing pole inserted into the apparatus, with the spike or stake section attached to the flashlight end, and with the apparatus in a completely assembled fourth state.

FIG. 4C shows a shows a side view of the apparatus 1 of FIG. 2 along with the part or handle of the fishing pole 300 inserted into the apparatus 1, with the spike or stake section 100 attached to the flashlight end 1a, and with the apparatus 1 in a completely assembled fourth state.

Figure 5:
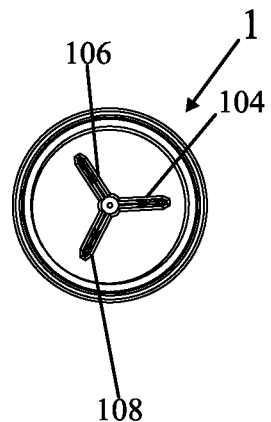
FIG. 5 shows a bottom view of the apparatus of FIG. 2, with the apparatus assembled in the state of FIG. 4C.

FIG. 5 shows a bottom view of the apparatus 1 of FIG. 2, with the apparatus 1 assembled in the state of FIG. 4C.

Figure 6:
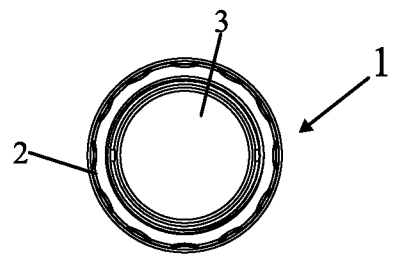
FIG. 6 shows a top view of the apparatus of FIG. 2, with the apparatus assembled but without the spike or stake section shown.

FIG. 6 shows a top view of a portion of the apparatus 1 of FIG. 2, with the apparatus assembled but without the spike or stake section 100 shown.

Figure 7:
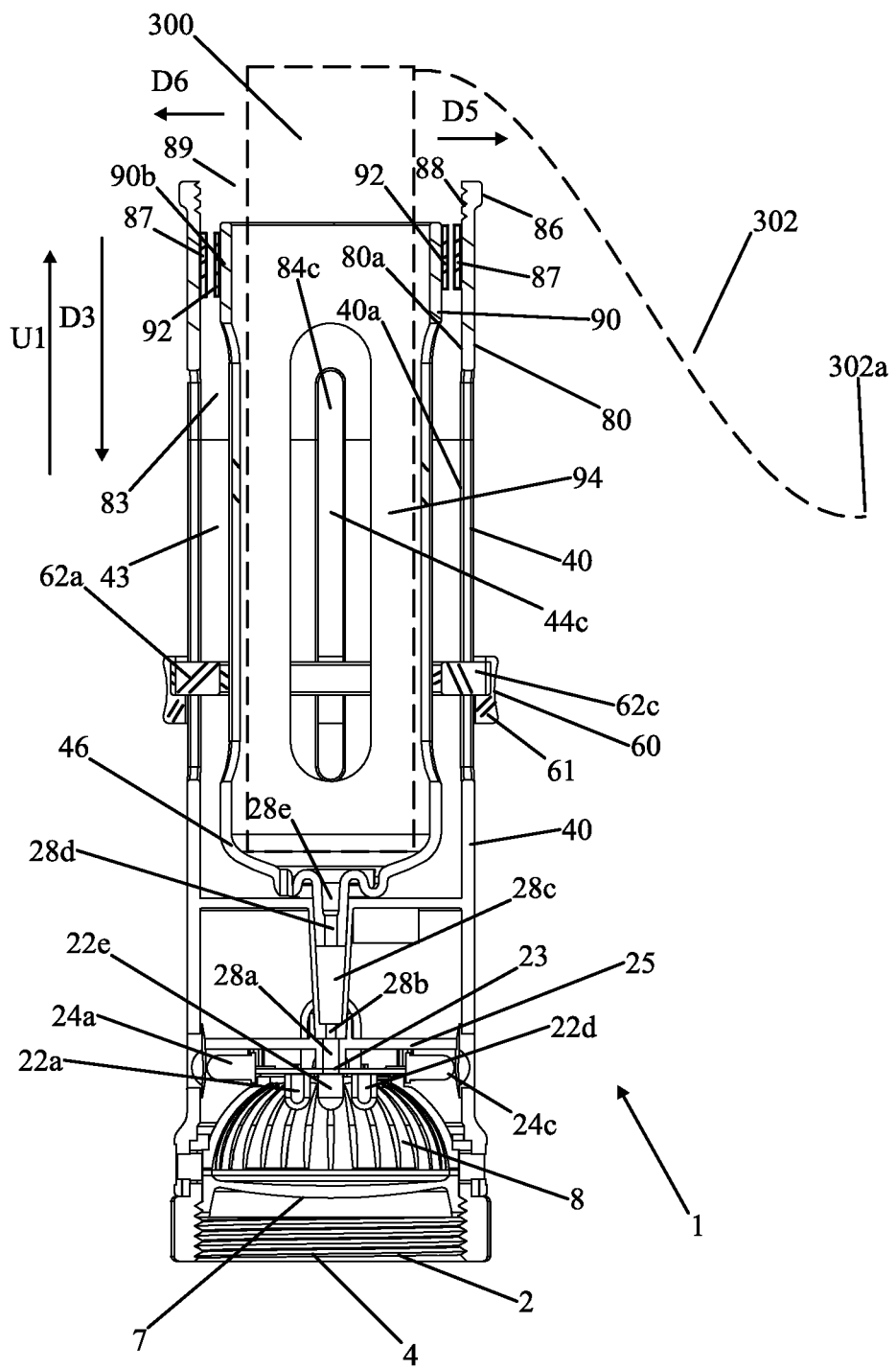
FIG. 7 shows a cross sectional view of the apparatus of FIG. 2, with the apparatus assembled but without the spike or stake section shown, and with a dashed line representing the location of an inserted portion of a fishing pole.

FIG. 7 shows a cross sectional view of the apparatus 1, with the apparatus 1 assembled but without the spike or stake section 100 shown, and with a dashed line representing the location of an inserted portion or handle of a fishing pole 300.

Figure 8:
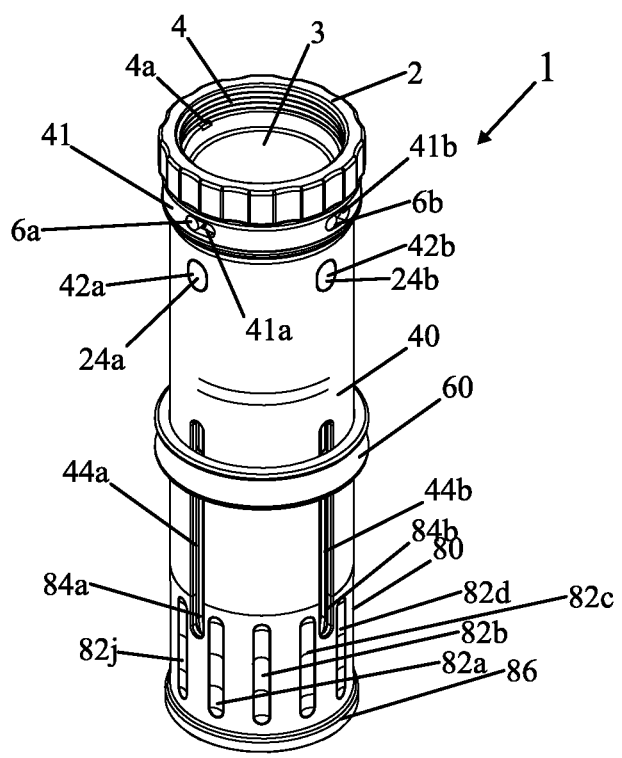
FIG. 8 shows a bottom perspective view of the apparatus of FIG. 2, with the apparatus assembled, but without the spike or stake section shown.

FIG. 8 shows a bottom perspective view of the apparatus 1 of FIG. 2, with the apparatus 1 assembled, but without the spike or stake section 100 shown.

Figure 9:
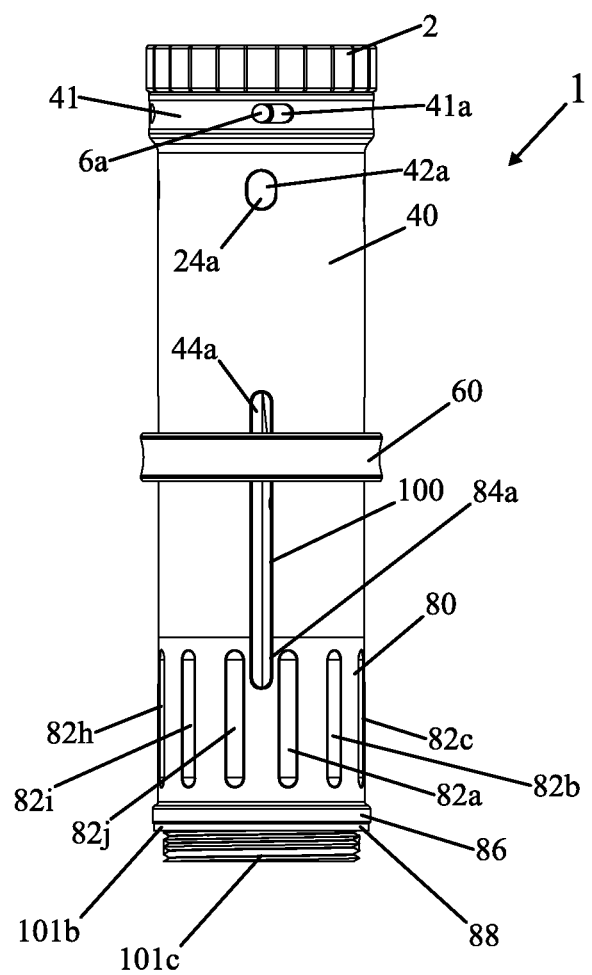
FIG. 9 shows a front view of the apparatus of FIG. 2, with the apparatus assembled and in a storage state in which the spike or stake section is stored.

FIG. 9 shows a front view of the apparatus 1 of FIG. 2, with the apparatus 1 assembled and in a storage state in which the spike or stake section 100 is stored.

Figure 10:
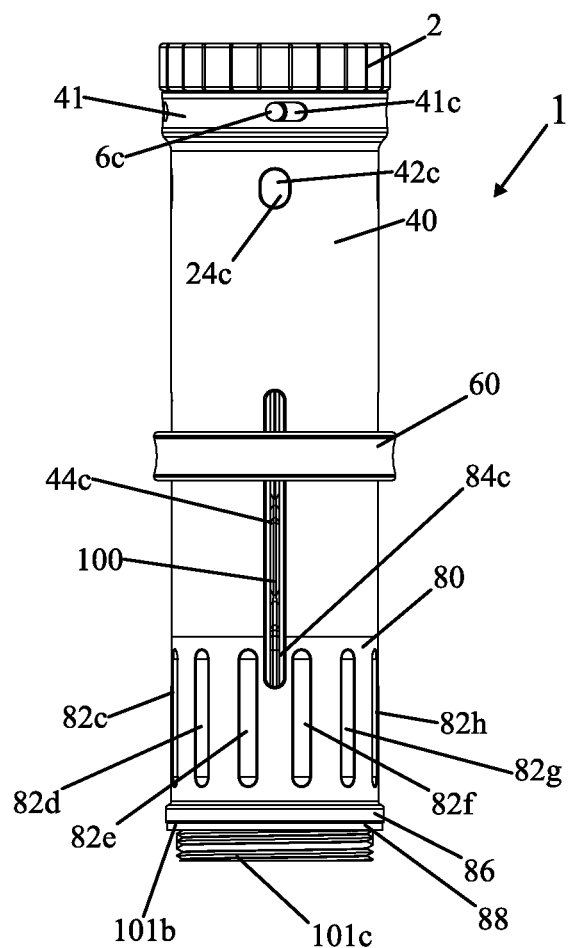
FIG. 10 shows a back view of the apparatus of FIG. 2, with the apparatus assembled and in the storage state.

FIG. 10 shows a back view of the apparatus 1 of FIG. 2, with the apparatus 1 assembled and in the storage state.

Figure 11:
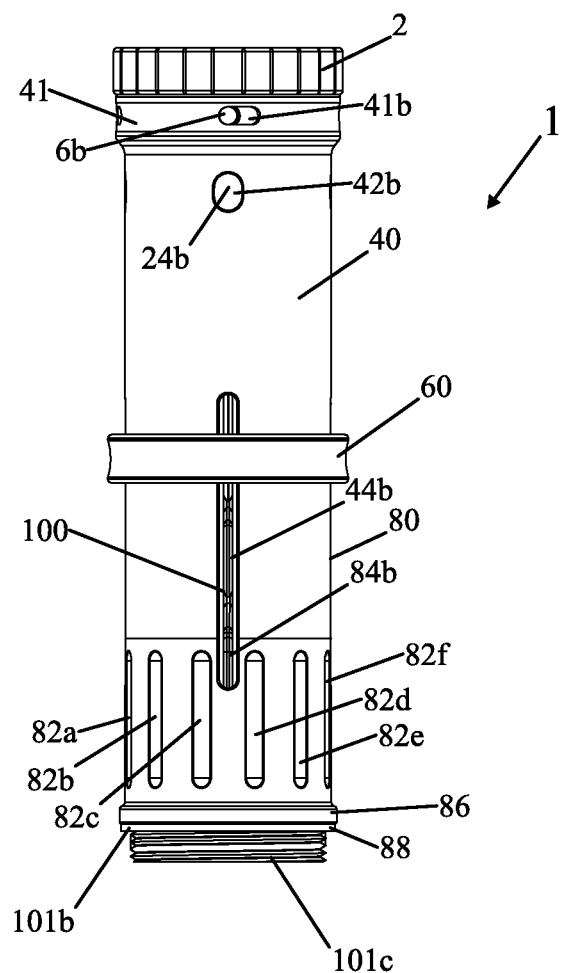
FIG. 11 shows a side view of the apparatus of FIG. 2, with the apparatus assembled and in the storage state.

FIG. 11 shows a side view of the apparatus 1 of FIG. 2, with the apparatus 1 assembled and in the storage state.

Figure 12:
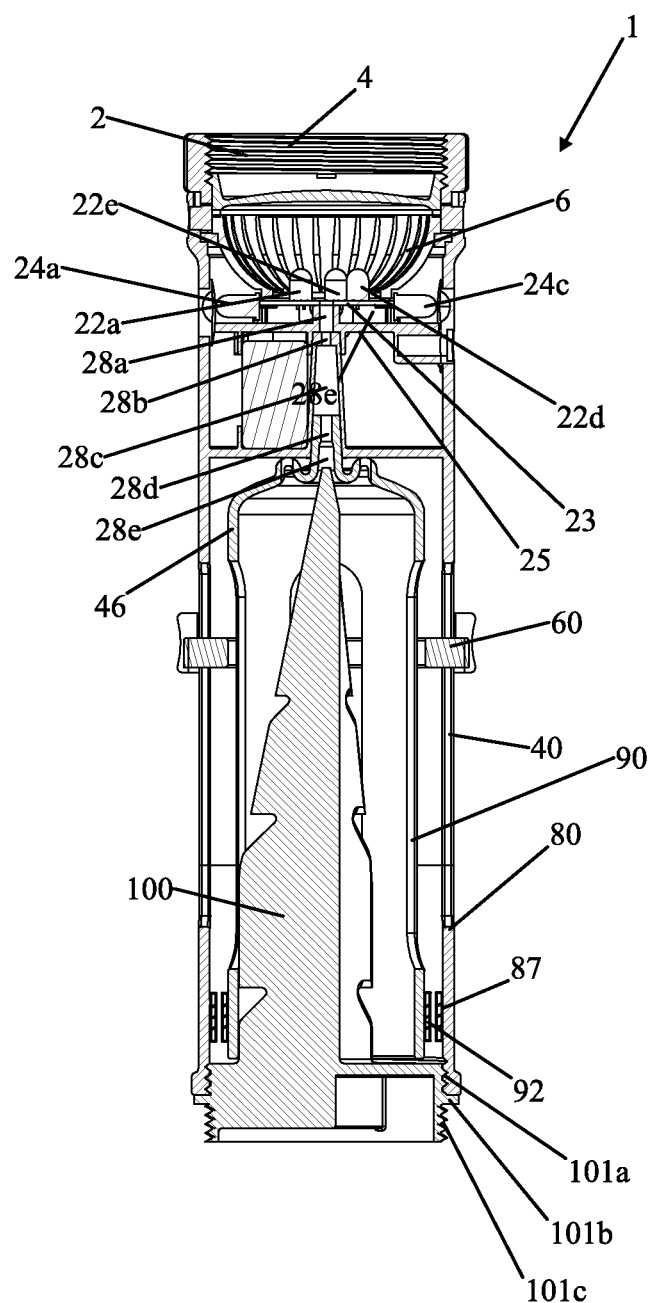
FIG. 12 shows a cross sectional view of the apparatus of FIG. 2, with the apparatus assembled and in the storage state.

FIG. 12 shows a cross sectional view of the apparatus 1 of FIG. 2, with the apparatus 1 assembled and in the storage state.

Figure 13:
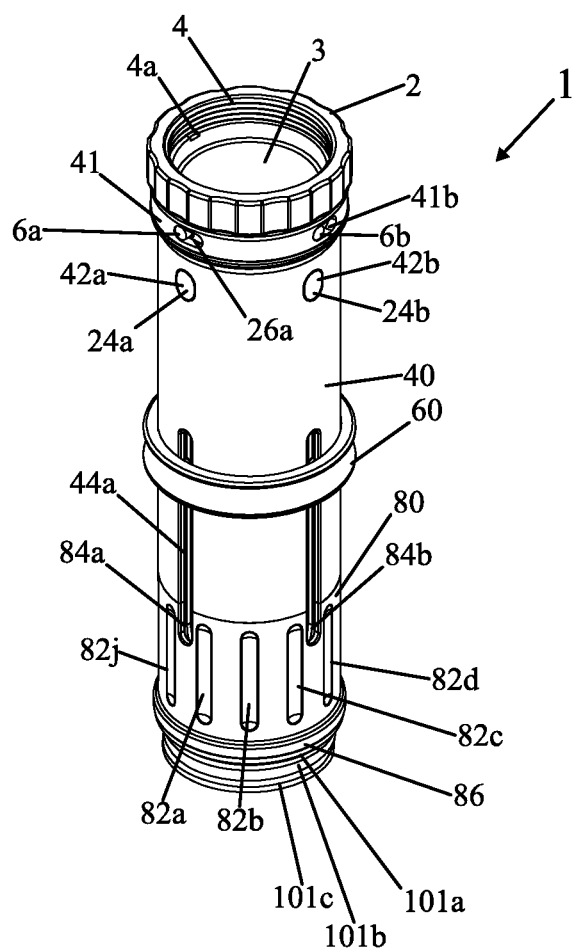
FIG. 13 shows a top perspective assembled view of the apparatus of FIG. 1, with the apparatus assembled and in a storage or closed state.

FIG. 13 shows a top perspective assembled view of the apparatus 1 of FIG. 1, with the apparatus 1 assembled and in a storage state.

Figure 14:
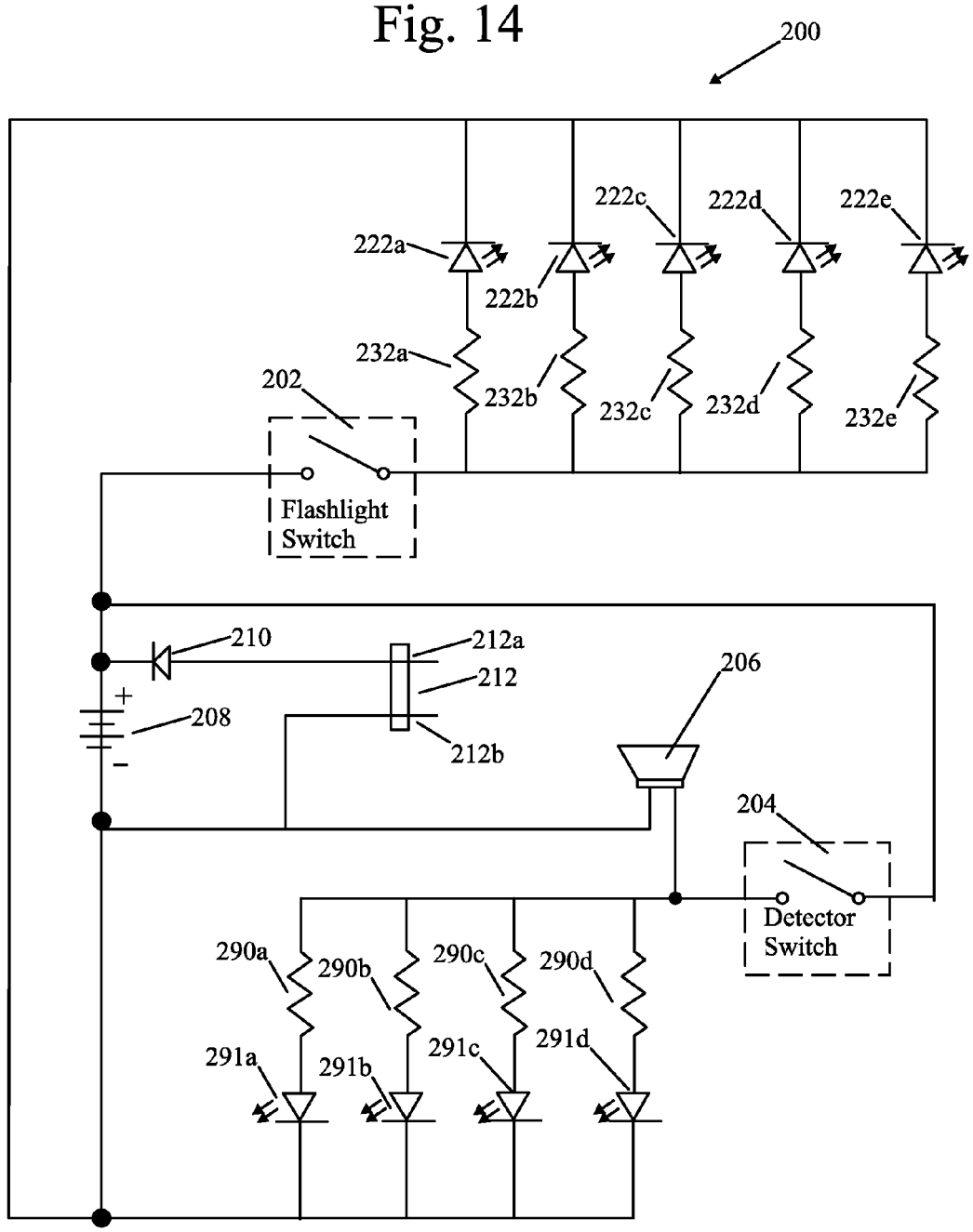
FIG. 14 shows a circuit diagram of various components which can be used with the apparatus of FIG. 1 in accordance with another embodiment of the present invention.

FIG. 14 shows a circuit diagram 200 of various components which can be used with the apparatus of FIG. 1 in accordance with another embodiment of the present invention.

Referring to FIGS. 1-13, the apparatus 1 may also be called a fish detector assembly. As shown by FIG. 1, the apparatus 1 includes a twist ring device 2, a lighting device 20, a main cage device 40, a slide adjuster 60, a secondary cage device 80, and a stake or spike device 100, shown in FIG. 2. The main cage device 40 and the secondary cage device 80 may form a compartment which is cylindrical or substantially cylindrical and which has a cavity 83, shown in FIG. 7, into which the compartment, section, or device 90 can be inserted as shown in FIG. 7.

The slide adjuster 60 and pins 62a and 62c can be made of rubber.

The apparatus also includes a device, section, or compartment 90 shown in FIG. 4A which may have a cylindrical or substantially cylindrical body portion 91 and a metal ring 92 attached thereto. The substantially cylindrical body portion 91 may have a top opening 90a (shown in FIG. 4A) leading to a hollow inner chamber or cavity 94 (shown by FIG. 4C) in which a substantially cylindrical fishing pole handle or rod 300 can be inserted as shown by FIGS. 4B and 4C.

As shown in FIG. 1, the twist ring device 2 includes a twist ring 2a, having ridges 2b, which can be gripped by an individual by using, for example, the individual's thumb and forefinger in order to turn the twist ring 2a and the twist ring device 2. The twist ring device 2 includes internal threads 4 shown in FIG. 1. As shown by referring to FIGS. 1, 4A-4B, the stake, spike, or spiked device 100 can be inserted into an opening 3 of the twist ring device 2 and screwed into end 1a. External threads 101c on the spike device 100 are screwed into internal threads 4 in order to attach the stake or spiked device 100 to the flashlight end 1a of the apparatus 1.

The twist ring device 2 can be snapped in or screwed into the main cage device 40 such as by use of external threads on the twist ring device 2 and external threads in the main cage device 40, not shown. The twist ring device 20 can be attached to the main cage device 40 in any other manner.

The twist ring device 2 includes a protrusion or indentation 4a which is used for attaching the twist ring device 2 to the main cage device 40. The twist ring device 2 includes lamp on/off rotation pins 6a and 6b (shown in FIG. 1) and 6c (shown in FIG. 3). There is a fourth lamp on/off rotation pin (not shown) which would be opposite of lamp on/off rotation pin 6b. The lamp on/off rotation pins 6a, 6b, 6c, and a further rotation pin opposite 6b are inserted into lamp on/off rotation slots 41a, 41b, 41c, and a further rotation slot opposite 41b, not shown. The twist ring device 2 may be configured so that when pins 6a, 6b, 6c, and pin opposite of 6b are in slots 41a, 41b, 41c, and slot opposite 41b, respectively, and the device 2 is attached to the main cage device 40 then LEDs 22a-e for a flashlight will turn on and project light out substantially in the direction D1 shown in FIG. 1 out from the ring device 2.

The twist ring device 2 includes a clear lens 7, shown by FIG. 1, which is can be used to protect the LEDs 22a-e. The twist ring device 2 also includes a reflector 8 shown by FIG. 1 and FIG. 7. The reflector 8 has location features or indentations 8a and 8b for locating the reflector 8. The reflector 8 reflects light out in the direction D1 from the LEDs 22a-e. The LEDs 22a-e may be located substantially at the center of the reflector 8, as shown by FIGS. 1, 7, and 12.

The switch device 20 includes flashlight light emitting diodes 22a, 22b, 22c, 22d, and 22e. The light emitting diodes 22a-e are fixed to a switch plate or plate 23. The switch device 20 also includes fishing detector alarm light emitting diode lenses 24a, 24b, 24c, and 24d which are also fixed to the switch plate 23. The switch plate 23 may include a device for generating a sound or audible alarm for detecting fish.

The main cage device 40 includes an upper section 41 having lamp on/off rotation slots 41a, 41b, 41c, and a slot opposite 41b, which may be identical to 41c, not shown, into which pins 6a, 6b, 6c, and a pin opposite 6b can be inserted to attach and/or align ring device 2 with main cage device 40. The main cage device 40 has located therein components 28a-e shown in FIG. 7. Any one or more of the components 28a-e may include a battery for providing power to the LEDs 22a-e and 24a-b or to other components. Any one or more of the components 28a-e may include a device for generating a sound or audible alarm. Any one or more of the components 28a-e may include circuitry for electrically connecting a sound alarm, a battery or batteries, or any of LEDs 22a-e and 24a-b.

The main cage device 40 also includes holes 42*a*, 42*b*, 42*c*, and another hole opposite 42*b*, which may be identical to 42*b*, not shown. When the ring device 2 is connected to the main cage device 40 so that the pins 6*a*-6*c* are aligned in the slots 41*a*-*c*, respectively, then the LEDs 24*a*-24*d* are aligned in holes 42*a*-42*c*, and the hole opposite 42*b*, respectively, so that light from the LEDs 24*a*-24*d* can come out of the holes 42*a*-*c* and the hole opposite 42*b*, in a direction which is substantially perpendicular to the main cage device 40, such as in the direction D2 from opening 42*a* shown in FIG. 1.

The main cage device 40 also includes elongated slots 44*a*, 44*b*, 44*c*, and another slot opposite 44*b*, which may be identical to 44*b*, not shown.

The apparatus 1 includes a slide adjuster 60 shown in FIGS. 1 and 7. The slide adjuster 60 includes a ring 61 which is outside of the main cage device 40 and the cage device 80. The ring 61 is connected to four pins or protrusions, two of which, 62*a* and 62*c*, are shown in FIG. 7. A further pin or protrusion between 62*a* and 62*c* on one side, and a further pin or protrusion between pin 62*a* and 62*c*, on an opposite side are not shown. The pins or protrusions 62*a*, 62*c* and further two pins not shown, are inserted into elongated slots 44*a*, 44*c*, and 44*b* and a slot opposite 44*b*, respectively. Thus the ring 61 remains attached to the main cage device 40 and the cage device 80 and the ring 61 can slide up in the direction U1 and down in the direction D3, shown in FIG. 7, with the pins 62*a*, 62*c*, and two further pins sliding up and down within the slots 44*a*, 44*c*, 44*b*, and a further slot not shown, respectively. The slide adjuster 60 is used to control fish detection alarm sensitivity as will be described later in the application.

The lower cage device 80 includes exterior design features or indentations 82*a*, 82*b*, 82*c*, 82*d*, 82*e*, 82*f*, 82*g*, 82*h*, 82*i*, and 82*j* referring to FIGS. 1-3. Each of 82*a*-*j* is typically not a slot. The lower cage device 80 also includes slide adjuster slots 84*a*, 84*b*, 84*c*, and a slot opposite 84*b*, which may be identical to slot 84*b*, and which is not shown. The slots 84*a*-*c* and a further slot not shown, are used to form a complete slot with slots 44*a*-*c*, and a further slot not shown, respectively. The lower cage device 80 includes an edge or flange 86. The flange 86 has inner threads 88 into which outer threads of the spike device 100 can be inserted to store spike device 100 when the apparatus 1 is not being used.

The spike device 100 includes a top threaded region 101*c* (shown in FIG. 4A) for connecting with the inner threads 4 shown in FIG. 1 of ring device 2 at the flashlight end 1*a*. The spike device 100 includes spike center or post 102 and spike blades 104, 106, (shown in FIG. 2) and 108 (shown in FIG. 3). The spike device 100 has a point, or pointed or sharpened center 102*a* as shown in FIG. 3. The blades 104, 106, and 108 have sharp serrated edges 104*a*, 106*a*, and 108*a* respectively.

FIG. 14 shows a circuit diagram 200 of various components which can be used with the apparatus 1 of FIG. 1 in accordance with another embodiment of the present invention. The diagram 200 shows light emitting diodes 222*a*, 222*b*, 222*c*, 222*d*, and 222*e* and series resistors or resistances 232*a*, 232*b*, 232*c*, 232*d*, and 232*e*, respectively. The light emitting diodes 222*a*-*e* and corresponding resistances 232*a*-*e* of FIG. 14 may represent or correspond to flashlight light emitting diodes 22*a*-22*e*, of FIG. 1, and their series resistances, not shown. The light emitting diodes 222*a*-*e* (and corresponding LEDs 22*a*-*e*) may be in parallel with each other, and may be connected to flashlight switch 202. The flashlight switch 202 may be located on the switch plate 23 or in the ring device 2 and the flashlight switch 202 may be turned on by attaching the ring device 2 to the main cage device 40 so that the pins 6*a*, 6*b*, 6*c*, and pin opposite 6*b* are aligned in slots 41*a*-*c*, and slot opposite 41*b*. Any other switch mechanism may be provided, such as a push button switch for turning on flashlight LEDs 22*a*-*e*.

The LEDs 222*a*-*e* (or 22*a*-*e* of FIG. 1) may be electrically connected to a power source or battery 208 (which may correspond to any of components 28*a*-*e* or a battery on switch plate 23 not shown) by flashlight switch 202. Thus LEDs 222*a*-*e* and corresponding LEDs 22*a*-*e* are turned on by putting the flashlight switch 202 in the on state or position.

FIG. 14 also shows LEDs 291*a*, 291*b*, 291*c*, and 291*d* in series with series resistances 290*a*, 290*b*, 290*c*, and 290*d*, respectively. The LEDs 291*a*-*d* correspond to fishing alarm LEDs 24*a*-*d*, respectively, shown in FIG. 1. The LEDs 291*a*-*d* are connected to a detector switch 204 and to a first input of an alarm device 206. The detector switch 204 may include a metal conducting ring 92 fixed around the periphery of the section or cylinder 90 as show in FIG. 7. The detector switch 204 may also include a metal conducting ring 87 which is fixed to the interior of the lower cage section 80 as shown in FIG. 7. When the rings 87 and 92 come in contact a circuit is completed with the alarm device 206, which may be any of components 28*a*-*e* in FIG. 7 or may be located on switch plate 23. The ring 87 may be electrically connected to a circuit through, for example, a conductive inner wall surface 80*a* in the cage portion 80 and an a conductive inner wall surface 40*a* in the cage portion 40 and through any of components 28*a*-*e* and plate 23 to a battery or to an alarm device 206. The alarm device 206 may include a speaker or any audio device for making a sound or audible noise. The ring 87 may also be electrically connected to LEDs 24*a*-*d*, through 80*a*, 40*a* and any of components 28*a*-*e*. A second input of the alarm device 206 is connected to one end of battery 208 and to battery charger 212 comprised of inputs 212*a* and 212*b*. The battery 208 and the battery charger 212 may be any of components 28*a*-*e*.

For fish detection operation, the spike or stake device 100 is attached to the flashlight end 1*a* so that the light from the LEDs 22*a*-*e* cannot be seen through opening 3 as shown by FIGS. 4A and 4B. The spike or stake device 100 may then be driven into a ground or ground surface 400, such as into sand on a beach, by driving the point 102*a*, and sharp portions 104, 106, and 108 into the ground 400 in the direction D4 shown in FIG. 4B. After the stake device 100 is driven into the ground 400 as shown in FIG. 4B, or before, the section 90 may be inserted through top opening 89 into cavities 83 and 43 of the cage sections 80 and 40 respectively, as shown by FIGS. 4C and 7. The fishing pole handle or portion 300 may then be inserted into the cavity 94 of the section 90.

After the apparatus 1 and fishing pole handle or portion 300 have been set up as in FIG. 4C a fishing line 302, attached to handle 300 may be cast out into the ocean, for example. The line 302 may also be cast out prior to the handle or portion 300 being inserted into the apparatus 1. The line 302 may have a hook and bait on its end 302*a*. A fish may get hooked on end 302*a* and may pull the line 302 which may cause the handle or portion 300 to be jolted or moved. The pole 300 is first pulled, moved, tilted, or jolted in the direction D5, shown in FIG. 7 by a tug on the fishing line 302 by a fish hooked at end 302*a*. This will cause the conductor or conductive metal ring 92, if there is sufficient force on the line 302, to come into electrical contact with the conductor or conductive metal ring 87. The pole handle 300 may also bounce back in the direction D6, after a tug on the line 302 by a fish hooked at end 302*a*, and if there is sufficient force on the line 302, the ring 92 will electrically contact the ring 87 in the direction D6, shown in FIG. 7. The adjustment device or ring 60 controls how easily the compartment 90 will be tilted or jolted and thereby controls how much force is needed on line 302 to cause the rings 92 and 87 to make electrical contact. For example, when the ring 60 is slid up to a location closer to opening 89 than to section 28e, it will be more difficult to tilt the compartment or section 90 and thus will require more force on line 302 to cause the rings 92 and 87 to make electrical contact, since the ring 60 and or pins 62a and 62c make it difficult for compartment 90 to tilt. When the ring 60 is slid down to a location, as in FIG. 7, which is closer to section 28e than to opening 89, the compartment or section 90 tilts more easily and less of a force on line 302 is required to cause the rings 92 and 87 to make electrical contact. The ring 60 and pins 62a and 62c may be made of rubber so that even when the ring 60 is close to the top opening 89, the ring 60 and pins 62a and 62c are elastic enough to allow the compartment 90 to be titled, moved or pulled to cause electrical contact between rings 92 and 87, when there is sufficient force on the line 302.

If there is sufficient force exerted on line 302, above a threshold, the movement of the portion or handle 300 causes the metal conductive ring 92 to contact the metal conductive ring 87 (the combination of rings 87 and 92 may be considered to be detector switch 204 in FIG. 14) causing a circuit to be closed and the audible alarm, such as 206, to emit a sound and causing the LED alarms or lights 290a-290d or 24a-d to light.

The sensitivity of the alarm system is adjusted by the ring 60 shown in FIG. 7. If the ring 60 is moved up in the direction U1, the top area 90b of section 90 is less likely to move or be tilted in the directions D5 and D6, when the fishing pole handle 300 is jostled by a tug on a fishing line connected to handle 300. When the ring 60 is moved downwards in the direction D3 of FIG. 7, the top area 90b of section 90 has more freedom to move in the directions D5 and D6 since it is less inhibited by the ring 60. If the ring 60 is moved upwards in the direction U1 to the top of section 90 near 90b, it will take a larger force exerted on line 302 to make the conductive rings 92 and 87 come in contact. If the ring 60 is moved downwards in the direction D3 to the bottom to the state shown in FIG. 7, it will take a smaller force exerted on line 302 than if it the ring 60 were closer toward 90b.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method comprising
attaching a stake device to a first device;
driving the stake device into a ground surface; and
inserting a fishing rod handle into a cavity of the first device; and
wherein the first device includes an alarm device which is triggered when the fishing rod handle is within the cavity of the first device and when the fishing rod handle is sufficiently jostled with a sufficient force as a result of a fish tugging on a fishing line connected to the fishing rod handle;
and further comprising moving a ring and thereby moving first and second opposing pins connected to the ring to adjust the sufficient force needed to trigger the alarm device;
wherein the ring surrounds the cavity of the first device;
wherein the ring has a periphery which is substantially three hundred and sixty degrees;
wherein the ring is exterior to the cavity of the first device so that at least a majority of the periphery the ring can be directly touched and gripped by a person's hand when the ring is moved to adjust the sufficient force needed to trigger the alarm device;
wherein the stake device is attached to the first device so that the stake device protrudes out in a first direction;
and further comprising detaching the stake device from the first device;
operating a flashlight device which is part of the first device, wherein the flashlight device operates independently of the alarm device;
wherein the first device has a width and a length which is substantially greater than the width;
wherein the flashlight device is operated to cause light to be projected in a path parallel to the length of the first device to an opening of the first device and emitted through the opening from the flashlight device; and
wherein the stake device closes the opening and lies in the path so that the stake device thereby prevents light from being emitted from the flashlight device through the opening, when the stake device is attached to the first device so that the stake device protrudes out in the first direction.

2. The method of claim 1 wherein
the first device includes a first compartment and a second compartment;
wherein the first compartment fits within the second compartment;
wherein the cavity is within the first compartment;
wherein the alarm device includes a first metal conductor attached to a periphery of the first compartment;
wherein the alarm device includes a second metal conductor attached to an interior of the second compartment; and
wherein the alarm device is triggered by the first metal conductor making electrical contact with the second metal conductor.

3. The method of claim 1 wherein
when the alarm device is triggered, the alarm device causes an audible alarm sound to be emitted from the alarm device.

4. The method of claim 1 wherein
when the alarm device is triggered, the alarm device causes a visual alarm to be emitted from the alarm device.

5. The method of claim 4 wherein
the alarm device includes one or more light emitting diodes which emit light when the alarm device is triggered.

6. The method of claim 1 wherein
each of the first and second opposing pins is inserted through an elongated slot in the first device, such that there is a first elongated slot for the first opposing pin and a second elongated slot for the second opposing pin; and
wherein when the ring is moved to adjust the sufficient force needed to trigger the alarm device, the first and the second opposing pins slide in the first elongated slot and the second elongated slot, respectively.

7. A method comprising
attaching a first end of a stake device to a first end of a first device, wherein the stake device has a second end which is opposite the first end of the stake device, and wherein the second end of the stake device has a point;
driving the second end of the stake device into a ground surface; and inserting a fishing rod handle into a cavity of the first device, through an opening located at a second end of the first device, which is opposite the first end of the first device; and wherein the first device includes an alarm device which is triggered when the fishing rod handle is within the cavity of the first device and when the fishing rod handle is sufficiently jostled with a sufficient force as a result of a fish tugging on a fishing line connected to the fishing rod handle;

and further comprising pulling the second end of the stake device out of the ground surface;

taking the fishing rod handle out of the cavity of the first device;

detaching the first end of the stake device from the first end of the first device to detach the stake device from the first device;

inserting the second end of the stake device into the cavity of the first device, through the opening located at the second end of the first device, so that the point of the stake device sits inside of the cavity of the first device; and and holding a majority of the stake device inside of the cavity of the first device; and wherein the first device includes a flashlight device;

wherein the first device has a width and a length which is substantially greater than the width;

and further comprising operating the flashlight device to cause light to be projected in a path parallel to the length of the first device from inside of the cavity of the first device to an opening at the first end of the first device and emitted out of the first device through the opening at the first end of the first device;

wherein when the first end of the stake device is attached to the first end of the first device, the stake device closes the opening at the first end of the first device and lies in the path so that the stake device thereby prevents light from being emitted from the flashlight device out of the first device through the opening at the first end of the first device; and wherein when the second end of the stake device is inserted into the cavity of the first device, through the opening located at the second end of the first device, the stake device does not close the opening at the first end of the first device and does not lie in the path so that the stake device does not thereby prevent light from being emitted from the flashlight device out of the first device through the opening at the first end of the first device.

\* \* \* \* \*